2,890,225

PROCESS FOR THE CONVERSION OF DIHYDROQUERCETIN TO QUERCETIN

Arthur S. Gregory, Longview, Wash., assignor to Weyerhaeuser Timber Company, Tacoma, Wash., a corporation of Washington No Drawing. Application April 17, 1957
Serial No. 653,270

7 Claims. (Cl. 260—345.2)

This invention relates to a process for the recovery of quercetin from dilute aqueous extracts of tree bark containing small amounts of dihydroquercetin in solution with other extracted soluble components of the bark.

Quercetin, which has the structural formula:

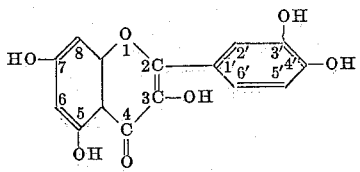

3,3',4',5,7-pentahydroxyflavone and dihydroquercetin, which has the structural formula:

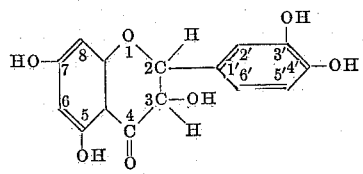

3,3',4',5,7-pentahydroxyflavanone are known compounds which occur in a number of products of vegetable origin. The flavanone dihydroquercetin occurs in the bark and heartwood of certain species of trees, notably Douglas fir (*Pseudotsuga taxifolia*), and hence it is sometimes called "taxifolin." Quercetin is found rather widespread in a number of plants, as for example hops, tea, horse chestnuts, red roses and buckwheat, and in the inner bark of the North American black oak (*Quercus velutina*), and in the bark and wood of Spanish chestnut (*Castenea vesca*). In the pure form dihydroquercetin occurs as white crystals in the form of needles or clusters of needles, or in its racemic form as elongated hexagons. When crystallized from water dihydroquercetin contains from 1 to 2.5 molecules water of crystallization. It melts at 241–242° C. with decomposition. It is insoluble in carbon tetrachloride and petroleum ether, very slightly soluble in benzene and related hydrocarbons, sparingly soluble in cold water (0.25% at 25° C.), moderately soluble in hot water (13.5% at 100° C.), and quite soluble in aldehydes, ketones, alcohols, ethers, esters, acetic acid, pyridine, dioxane, and in aqueous solutions having mild alkaline reaction. It reduces Fehling's solution, Tollen's solution, and silver nitrate. It forms a green solution with ferric chloride; it turns red when the solution is made alkaline; it forms mono and di substituted salts of alkali metals and insoluble salts with lead acetate, copper sulphate and alkaline earth metal cations at alkaline pH levels; and forms a dye with diazo compounds. Dihydroquercetin is useful as an antioxidant in fats and oils, foodstuffs and rubber processing. It can be used as an ultraviolet absorbing agent. It is also useful as a pharmaceutical chemical and a dye intermediate, and is said to be useful as a tannin to produce white leathers, and as a substitute for catechol and resorcinol in some reactions.

Quercetin in pure form occurs as bright yellow needle-shaped crystals which melt at 316–318° C. with decomposition. It is insoluble in benzene and carbon tetrachloride, very slightly soluble in water (less than 0.002% at 25° C. and less than 0.1% at 100° C.), slightly soluble in aqueous sodium bicarbonate solution, but quite soluble in oxygenated organic solvents and in some alkaline aqueous solutions. Quercetin is useful as a pharmaceutical chemical, particularly in the form of its glycoside, rutin. It is also useful as a dye or as a dye intermediate, as an antioxidant, and as a starting material for various chemical syntheses.

The dihydroquercetin (DHQ) content of Douglas fir bark may be water extracted in admixture with other water soluble components of the bark, such as waxes, phenolic acids, tannins, phlobaphenes, and carbohydrates. These contaminants, and particularly the phlobaphenes, are very difficult to separate from the DHQ. Techniques have been developed for the hot water countercurrent extraction of the bark or physical components of the bark, particularly the cork component, containing the dihydroquercetin which will produce an extract containing approximately 3% of soluble solids. One method utilizing such techniques is described in U.S. Patent No. 2,832,765, issued April 29, 1958, to James R. Roberts and Arthur S. Gregory. Approximately 10% of the dry solids of the bark are water soluble extractible solids. Dihydroquercetin represents approximately 18% of these soluble solids. Thus, the extract at 3% soluble solids contains about 0.54% DHQ. The dispersing or crystallization inhibiting powers of the non-dihydroquercetin materials present in the extract are quite marked. It would be expected that dihydroquercetin, because of its very low solubility, would easily crystallize out upon concentration and cooling. However, even when concentrated to levels greatly exceeding the solubility of dihydroquercetin in pure water, yields and purity of dihydroquercetin obtained are low. Upon cooling the concentrated extract the dihydroquercetin largely remains in solution, presumably because of the solubilizing eeffcts contributed by the contaminating components of the extract.

The dihydroquercetin present in the extract may be removed by means of selective sorption on chosen sorbents, or by extraction using selected water immiscible solvents having distribution coefficients which are favorable. However, these methods have economic limitations.

Since quercetin is far less soluble in water than dihydroquercetin, the conversion of the dihydroquercetin to quercetin in the aqueous extract has been explored. It is known that pure dihydroquercetin may be oxidized by air to quercetin (Pew, JACS 70, 3033; 1948). This known process calls for heating the flavanone with 2 N sulphuric acid on a steam bath under a reflux condenser while passing a gentle stream of air over the liquid. Passing the air into the liquid containing the pure DHQ results in extensive decomposition into amorphous products. Three 27-hour treatments each followed by a separation of the crystals from the filtrate are required to produce a 76% yield of pure quercetin from pure dihydroquercetin. It is reported that attempts to bring about dehydrogenation of the flavanones with other oxidizing agents or by catalytic means were unsuccessful.

This known process by which pure dihydroquercetin has been converted to quercetin, when applied to an aqueous extract of Douglas fir bark, results in the precipitation of a large proportion of the non-dihydroquercetin phenolics as phlobaphenes which are insoluble under the acid conditions of the Pew process. As in the case of the dihydroquercetin it is also very difficult to separate these insoluble phlobaphenes from the quercetin. Substituting strongly alkaline conditions for the strongly acid conditions of the Pew process in order to favor retention in solution of the impurities fails to improve the situation, since extensive degradation of the dihydroquercetin results.

I have now found that dihydroquercetin may be oxidized readily to quercetin and the latter selectively precipitated and recovered from an aqueous bark extract containing DHQ and other extractible bark soluble solids in high yields in a short time by an air oxidation method. By decreasing the acidity of the extract to a value between pH 5 and pH 7 (as measured after cooling to 25° C.), and controlling the rate of oxidation at a temperature of the solution within narrow limitations, recoveries of over 70% of the available quercetin in purities of over 90% have thus been accomplished.

The normal pH of a water extract of Douglas fir bark is approximately 3.4. This is adjusted to a value between pH 5 and pH 7 by addition of a soluble alkaline reacting compound such as sodium, potassium and ammonium hydroxide, sodium, potassium and ammonium acetate, sodium and potassium phosphate, sodium potassium and ammonium sulphite and mixtures of such compounds. Under reaction temperatures of 90–100° C., the rate of formation and yield of precipitated high quality quercetin increases with an increase in the pH from the normal value of pH 3.4 to an optimum in the pH 5–7 range (pH values being measured at 25° C.). At pH's above 7 yields decrease because of competing reactions. The purity of the product increases with pH apparently because of the higher solubility of the other extracted solubles in the less acid solution.

Increase in the temperature accelerates the reactions taking place, but at the same time reduces the solubility of the oxygen in the aqueous medium. Fast reaction rates and hence higher temperatures are preferred in order to insure high yields and high purity of product in the minimum amount of time. To carry out the process a gas containing free oxygen is passed through the reaction solution at a rate such as to maintain approximate oxygen saturation of the extract.

Peculiarly, side reactions of DHQ experienced by dispersion of the oxidizing gas in the solution under the very acid conditions of the Pew process do not occur to any appreciable extent under the conditions of my process. Since the solubility of the oxygen of the treating gas is decreased at the higher more desirable temperatures, it is necessary in order to maintain the reaction rate to apply the gas at higher rates as the temperature is raised. It has been found that the maximum reaction rate can be maintained for a 3% extract by feeding a gas containing free oxygen at a rate such as to provide approximately 0.04 volume of oxygen per minute per volume of extract at 95° C. On a batch basis yields of 70% plus can be obtained in from 1½ to 6 hours under these conditions. On approaching the upper limit of the temperature range, that is, 100° C., the solubility of the gas in the aqueous media approaches 0. Although this imposes a limit on oxygen concentration, the gas containing free oxygen passing through the reaction solution at the higher feed rates will replace the oxygen removed by reaction and maintain the equilibrium solubility of the oxygen in the high temperature solution. There is also a strong possibility that certain of the contaminant components of the Douglas fir bark aqueous extract act as oxygen traps in the sense that they apparently bind the oxygen loosely and make it more available or more reactive. This phenomenon results in an apparent increased solubility of the oxygen at boiling conditions. Thus, the oxygen would enter the system at the bubble interface, and if it encountered an entrapping material and became affixed thereto through the formation of a peroxide, epoxide, or other type of loose bonding before being swept out of the system by the escaping steam, it would be held until utilized in an oxidation. That this apparent increased solubility does take place at the higher temperatures would seem to be demonstrated by the fact that DHQ is oxidized to quercetin more rapidly in the presence of the non-dihydroquercetin extract solubles than in a pure water system.

The quercetin formed in the reaction undergoes decomposition when in the presence of the extract under normal oxidizing conditions. In order to effect high yields and high purity, therefore, it is necessary that the reaction be carried out as rapidly as possible. This requires not only that the oxygen content of the reaction solution be maintained at the saturation level and that the reaction be run at high temperatures, but that the oxygen supplied to the system be finely dispersed throughout the solution. The gas containing the free oxygen, such as air, pure oxygen, or mixtures of air and oxygen, may be bubbled into the solution by known means and then dispersed by vigorous agitation. At the preferred higher temperatures this tends to keep the reaction mixture saturated with oxygen and to permit maximum agitation at bubble interfaces.

When operating the process at the required temperatures of from 90–100° C. and maintaining a condition of oxygen saturation by means of a steady external supply of finely dispersed gas containing free oxygen, reaction should be completed in from 1–6 hours with a good yield of high purity quercetin. The exact time of reaction will be affected by the composition of the extract. The latter varies with the raw material. Thus, the composition of Douglas fir bark waste obtained at a millsite varies from log to log depending upon the age of the tree, portion of the tree, length of time since the tree was felled, duration of log pond storage, and the handling of the bark after removal from the log. On an average a 3% hot water extract of ground Douglas fir bark or bark fraction such as the cork fraction oxidized under the conditions of this process will produce the desired effect within the 1–6 hour period.

The oxidation may be performed as a batch operation or as a continuous process. In the latter case the quercetin is continuously removed as formed by continuous filtration methods, and new extract is continuously added to the reaction solution. In a batch procedure the reaction is followed by periodic determination of the dihydroquercetin and quercetin content of the extract solution, and when the tests show that the maximum amount of quercetin has been formed the reaction mixture is cooled and the quercetin removed by filtration. At the point of maximum quercetin formation the dihydroquercetin will have been reduced to a concentration of from 0.002 to 0.03 gram per 100 ml. of the mixture. Hence, when the tests show the dihydroquercetin concentration has been reduced to a figure in that range the reaction should be stopped. For most mixtures the maximum quercetin formation will be reached at a dihydroquercetin concentration of approximately 0.02 gram per 100 ml.

Conversion of dihydroquercetin to quercetin can be effected at more dilute concentrations than the 3% extract mentioned above. However, the yield of quercetin which can be removed by filtration is low due to the greater percentage of loss resulting from quercetin solubility. As the concentration of the extract is increased above 3%, the purity of quercetin which separates from the cooled reaction mixture decreases due to the precipitation of materials insoluble at such higher concentrations. The optimum concentration of the extract for the reaction therefore is about 3 to 8% soluble solids.

The following examples will serve to further illustrate the best manner in which to perform my invention. No limitations on the scope of the invention other than those specifically recited in the appended claims are intended.

*Example 1*

2000 grams of a water extract of Douglas fir bark containing 3.08% of dissolved solids of which 22.75% was dihydroquercetin was reacted in a 3-necked, 5-liter flask equipped with air inlet, reflux condenser, and electric stirrer. The flask was heated by immersion in a triethylene glycol bath maintained at 125° C.

The extract was heated to 100° C. and held at reflux conditions for 5 minutes, after which 17.0 ml. of 10% sodium hydroxide solution was added. The pH of the resulting solution was 6.10. Heating of the solution to 100° C. was resumed, and air was bubbled through the reaction mixture at the rate of 200 ml. per liter per minute. The solution was agitated by vigorous stirring throughout the reaction.

The dihydroquercetin and quercetin contents were followed by periodic sampling. After 170 minutes it was determined that a maximum had been reached for the formation of quercetin. The reaction mixture was cooled, and the resulting yellow crystalline precipitate separated by filtering. By ultraviolet spectra of an ethyl acetate solution of the said precipitate it was determined that the product was 81.3% pure quercetin. The yield was 62.6% of theoretical based on the original weight of dihydroquercetin.

*Example II*

2000 grams of a water extract of Douglas fir bark containing 2.45% dissolved solids of which 19.7% was dihydroquercetin was reacted in a 3-necked, 5-liter flask equipped with an air inlet, reflux condenser, and electric stirrer. The flask was heated by immersion in a triethylene glycol bath maintained at 125° C.

The extract was heated to 100° C. and held at reflux conditions for 5 minutes, after which 7.8 grams of sodium sulphite dissolved in 70 ml. of water were added. The pH of the resulting solution was 6.3. Heating of the solution to 100° C. was resumed, and air was bubbled through the reaction mixture at the rate of 200 ml. per minute, while maintaining vigorous agitation of the solution. During the reaction, the pH fell to levels below 6.0 and when this occurred it was readjusted to pH 6.0 by adding sodium sulfite dissolved in water. A total of 3.3 grams of sodium sulfite in 30 ml. of water was used for this purpose.

The dihydroquercetin and quercetin contents were followed by periodic sampling, and after 300 minutes it was determined that there was no further amount of quercetin being formed. The reaction mixture was cooled, and the resulting yellow crystalline precipitate separated by filtering. By ultravoilet spectroscopy of an ethyl acetate solution of the precipitate it was determined that the product was 90.4% quercetin. The quercetin yield was 70.8% of theoretical based on the original weight of dihydroquercetin.

*Example III*

2000 grams of a water extract of Douglas fir bark containing 2.45% of dissolved solids of which 19.7% was dihydroquercetin was reacted in a 3-necked, 5-liter flask equipped with air inlet, reflux condenser, and electric stirrer. The flask was heated by immersion in a triethylene gylcol bath maintained at 125° C.

The extract was heated to 100° C. and held at reflux conditions for 5 minutes, after which a solution containing 1.5 grams of sodium hydroxide and 1.5 grams of sodium sulphide in 18 ml. of water was added. The solution was heated to 100° C. and air bubbled through the reaction mixture at the rate of 200 ml. per liter per minute, while maintaining vigorous stirring. The pH of the mixture dropped during the reaction from an initial value of 6.55 to 5.85.

The dihydroquercetin and quercetin contents were followed by periodic sampling, and after 210 minutes it was determined that the production of quercetin had reached a maximum. The reaction mixture was cooled and the resulting yellow crystalline precipitate separated by filtration. This was placed in an ethyl acetate solution and determined to be 93.5% pure quercetin by ultraviolet spectroscopy. The yield of quercetin was 66.8% of the theoretical based on the original weight of dihydroquercetin.

*Example IV*

2000 grams of a water extract of Douglas fir bark containing 2.83% of dissolved solids of which 32.1% was dihydroquercetin was reacted in a 3-necked, 5-liter flask equipped with air inlet, reflux condenser, and electric stirrer. The flask was heated by immersion in a triethylene glycol bath maintained at 125° C.

The extract was heated to 100° C. under reflux and 277 grams of a 20% sodium acetate solution (55.4 grams of sodium acetate) were then added. The pH of the resulting solution was 6.3. Heating of the solution to 100° C. was resumed, and air was bubbled through the reaction mixture at the rate of 200 ml. per liter per minute, and the solution was agitated by vigorous stirring throughout the reaction.

The dihydroquercetin and quercetin contents were followed by periodic sampling and after 330 minutes the reaction mixture was cooled, and the resulting yellow crystalline precipitate separated by filtration. The latter was placed in an ethyl acetate solution and determined by ultraviolet spectroscopy to be quercetin of 61.5% purity. The quercetin yield was 63.0% of theoretical, based on the original weight of the dihydroquercetin.

*Example V*

2000 grams of a water extract of Douglas fir bark containing 3.22% of dissolved solids of which 10% was dihydroquercetin was reacted in a 3-necked, 5-liter flask equipped with air inlet, reflux condenser, and electric stirrer. The flask was heated by immersion in a triethylene glycol bath maintained at 125° C.

The extract was heated to 100° C. and 1.98 grams of sodium hydroxide in 18 ml. of water then added. The pH of the resulting solution was 6.1. Heating of the solution to 100° C. was resumed, and air was bubbled through the reaction mixture at the rate of 200 ml. per liter per minute, and the solution was agitated by vigorous stirring throughout the reaction.

The dihydroquercetin and quercetin contents of the reaction solution were followed by periodic sampling, and after 90 minutes the reaction mixture was cooled, and the resulting yellow crystalline precipitate separated by filtration. The latter was placed in an ethyl acetate solution and determined by ultraviolet spectroscopy to be quercetin of 77% purity. The yield of quercetin was 45.6% of theoretical based on the original weight of dihydroquercetin.

*Example VI*

2000 grams of a water extract of Douglas fir bark containing 2.91% of dissolved solids of which 22.7% was dihydroquercetin was reacted in a 3-necked, 5-liter flask equipped with air inlet, reflux condenser, and electric stirrer. The flask was heated by immersion in a triethylene glycol bath maintained at 125° C.

The extract was heated to 95° C. and held at reflux conditions for 5 minutes, after which 15.7 grams of sodium sulphite were added. The pH of the resulting solution was 6.0. Heating of the solution to 95° C. was resumed, and air was bubbled through the reaction mixture at the rate of 200 ml. per liter per minute, while agitating the solution vigorously by stirring.

The dihydroquercetin and quercetin contents were followed by periodic sampling, and after 180 minutes the reaction mixture was cooled and the resulting yellow crystalline precipitate separated by filtration. The latter was placed in an ethyl acetate solution and determined by ultraviolet spectroscopy to be quercetin of 85.5% purity. The yield of quercetin was 56.6% based on the original weight of dihydroquercetin.

Example VII 8500 pounds of a water extract of the pure cork fraction of Douglas fir bark, containing 2.75% of dissolved solids of which 49.8% was dihydroquercetin were reacted in a large open wooden tank equipped with air inlet, heating and cooling coils, steam inlet and electric stirrer.

The extract was heated to 98° C. and 5.64 pounds of sodium hydroxide added, bringing the pH to 6.15. Air was then introduced into the hot, agitated solution at the rate of 12.5 cubic feet per minute and the reaction continued for five hours, at which time the maximum amount of quercetin had formed.

The extract was then cooled and the resulting yellow crystalline precipitate separated by filtration. By ultraviolet spectroscopy, the product was found to be quercetin of 96.6% purity. The yield was 68.6% of the theoretical based on the dihydroquercetin originally present.

Having thus described my invention and illustrated it by preferred embodiments, I claim as new and desire to protect by Letters Patent:

1. The process of converting dihydroquercetin to quercetin in an aqueous extract derived from a member of the group consisting of tree bark and physical components of tree bark, said extract containing the dihydroquercetin in admixture with other soluble extracted materials, and recovering the quercetin in substantially pure form which comprises adding to the said aqueous extract a water-soluble alkaline reacting substance selected from the group consisting of alkali metal and ammonium hydroxides, sulfites, acetates, and phosphates, in an amount sufficient to adjust the pH of the extract to a value between 5.0 and 7.0, introducing a gas containing free oxygen at a rate sufficient to maintain approximate oxygen saturation of the extract, while agitating the extract vigorously and heating it to maintain a temperature of from 90–100° C., and separating the water-insoluble quercetin from the remainder of the extract at any time after initiating the conversion reaction.

2. The process of converting dihydroquercetin to quercetin in an aqueous extract derived from a member of the group consisting of tree bark and physical components of tree bark, said extract containing the dihydroquercetin in admixture with other extracted soluble materials, and recovering the quercetin in a substantially pure form, which comprises heating the said aqueous extract to a temperature of from 90–100° C., adding to the heated aqueous extract a water-soluble alkaline reacting substance selected from the group consisting of alkali metal and ammonium hydroxides, sulfites, acetates, and phosphates, in an amount sufficient to adjust the pH of the extract to a value of between 5.0 and 7.0, introducing a gas containing free oxygen at a rate sufficient to maintain approximate oxygen saturation of the extract, while agitating the extract vigorously and maintaining the aforesaid temperature for a period of about 1–6 hours, and separating the resulting water-insoluble quercetin from the remainder of the extract.

3. The process of claim 1 in which the water soluble alkaline reacting substance is sodium hydroxide.

4. The process of claim 1 in which the water soluble alkaline reacting substance is sodium sulphite.

5. The process of claim 1 in which the water soluble alkaline reacting substance is a mixture of sodium hydroxide and sodium sulphite.

6. The process of claim 1 in which the water soluble alkaline reacting substance is sodium acetate.

7. The process of claim 1 in which the water soluble alkaline reacting substance is sodium hydroxide in an amount sufficient to adjust the pH of the solution to 6.0, the solids content of the water extract is approximately 3%, the temperature of the reaction mixture is maintained at 95° C., and the gas containing free oxygen is air.

References Cited in the file of this patent

UNITED STATES PATENTS 2,744,920    Kurth _____ May 8, 1956

OTHER REFERENCES

Elderfield: Heterocyclic Cmpds., vol. 2, pp. 383–4, Wiley (1951).